United States Patent

Armstrong et al.

[11] 3,930,629
[45] Jan. 6, 1976

[54] OVERHEATED JOURNAL BEARING DERAILMENT PREVENTION SYSTEM

[75] Inventors: John H. Armstrong, Silver Spring; Frank C. Kluge, Takoma Park, both of Md.

[73] Assignee: The United States of America as represented by the Secretary of the Navy, Washington, D.C.

[22] Filed: Aug. 7, 1974

[21] Appl. No.: 495,478

[52] U.S. Cl. ............................. 246/169 A; 340/57
[51] Int. Cl.² .......................................... B61K 9/04
[58] Field of Search............ 246/169 R, 169 A, 170, 246/172, 182 A, 182 B, 188; 116/DIG. 38, 114.5, 114 AE, 101, 106, 114 Y, 114 AH; 200/61.08; 340/57; 102/70.2 GA; 180/103

[56] References Cited
UNITED STATES PATENTS

| | | |
|---|---|---|
| 1,512,456 | 10/1924 | Carman ........................ 246/169 A |
| 3,803,374 | 4/1974 | Delgendre...................... 200/61.08 |

*Primary Examiner*—Trygve M. Blix
*Assistant Examiner*—Reinhard J. Eisenzopf
*Attorney, Agent, or Firm*—R. S. Sciascia; J. A. Cooke; F. K. Yee

[57] ABSTRACT

An anti-derailment system to prevent train derailment due to axle failure resulting from journal bearing overheating includes a thermal sensor to continuously monitor the temperature of the bearing and to activate the brake system when the temperature exceeds a predetermined level. A thermally-responsive element located in the journal bearing adapter physically deforms to activate a power source. The resulting signal initiates an electroexplosive brake line venting mechanism, puncturing and venting the brake line to stop the train. Several configurations of the thermal sensor and the power source are possible.

21 Claims, 9 Drawing Figures

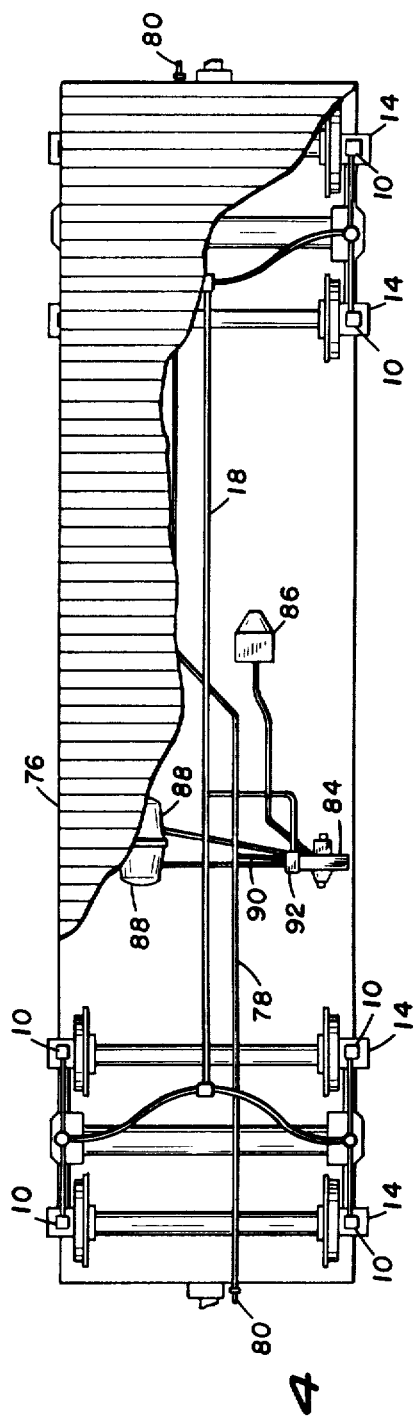
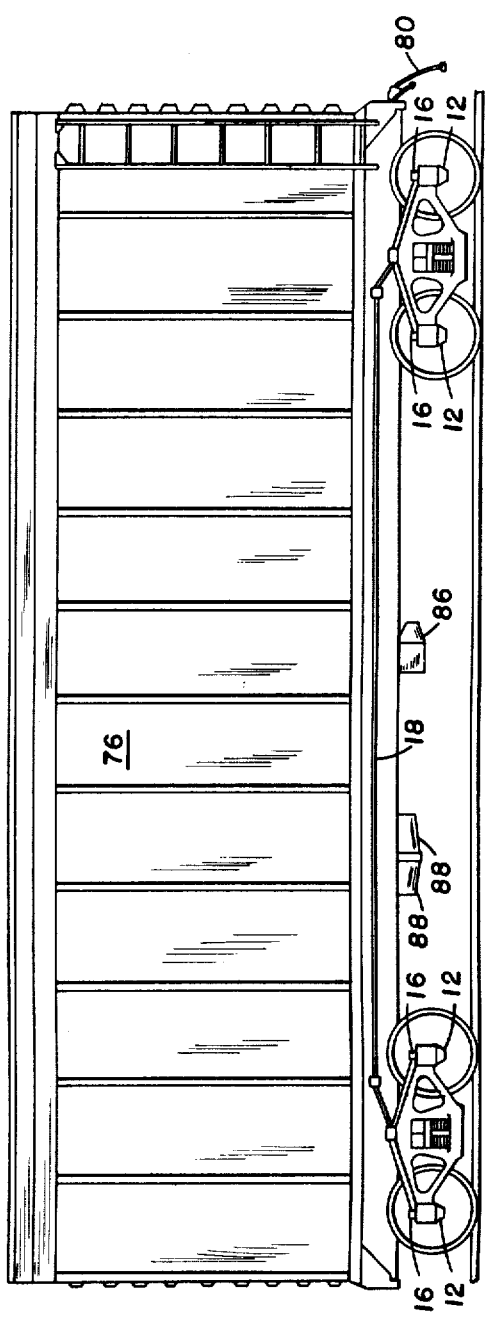

OVERHEATED JOURNAL BEARING DERAILMENT PREVENTION SYSTEM

BACKGROUND OF THE INVENTION

This invention relates generally to sensor systems and more particularly to a thermal sensor system which detects incipient wheel journal bearing overheating on rail vehicles and activates the air brakes to stop the vehicle prior to bearing failure and possible derailment.

Railroad journal bearing failures due to overheating resulting in axle-end fracture and consequent dropping of the rail car sideframe to the roadway have been a most prevalent source of major accidents. These failures, called "hotboxes", if not detected in time, may lead to accidents that result in losses of millions of dollars and risk the lives of persons aboard the train, or in the vicinity, particularly where hazardous cargoes are involved.

Present methods of detecting hotboxes include inspection in train yards and from passing trains by railroad personnel. Along main lines, bearing temperatures are monitored in route by automatic, track-side, infrared detectors. Inspection by railroad personnel is, however, time-consuming and costly since each journal box has to be individually checked. Automatic wayside infrared detection stations have been installed at several hundred locations. These units, capable of scanning each bearing on a passing train and reporting and/or recording its temperature, have been developed to a point of excellent effectiveness. However, at a cost of approximately $50,000 each, plus data transmission equipment to automatic signals or manned monitoring points, they have not generally been installed on low-traffic-density lines or at close enough intervals on mainlines to detect all hotboxes before catastrophic failure can develop.

Higher speeds, heavier loads, extended runs and other factors have necessitated the increased use of more expensive roller bearings and improved bearing lubrication systems to reduce bearing failures. The reduction in bearing failures, however, has not brought about a corresponding decrease in hotbox-caused derailments because the rate of derailments per detected hotbox has increased, resulting in a relatively constant hotbox derailment total. The decreased rate of detection may be attributed to several factors, such as the more rapid progression from initiation of bearing failure to catastrophic assembly failure characteristic of roller bearings and the less detectable early signs of roller bearing failure than bearings with lubricator pads.

Actual axle failure from a hotbox occurs from heating to a temperature where the steel is significantly weakened, since nominal stress levels are low. The energy input available from the maximum torque input from one pair of wheels to a seized bearing assembly is sufficient to raise the axle-end steel to 1000°F in less than one minute. It is not likely that this concentrated an input will occur in an actual assembly, but it is apparent that failure can occur in a matter of a very few miles or minutes of travel. Continuous, automatic monitoring of each bearing may be expected to provide virtually 100% protection from this mode of failure, provided the thermal path to the sensor is as short as that from the bearing to the axle and there is no significant time lag in the sensor.

Once a trouble signal is generated at one of the sensor locations, e.g., at the journal housing, and amplified to a usable power level, economic logic dictates that it be transmitted to a single, on-car location to actuate the inter-car communication link input. Several aspects of any such system are vital. Parallel inputs into the communication link must be mutually compatible. Failure of one or more sensors should not impair system operation. System refurbishment after an actuation, if required at all, must be reasonably inexpensive and capable of accomplishment at relatively widespread and unsophisticated facilities. Low cost over the complete life cycle, including all initial hardware costs, installation and check out, maintenance and repair, periodic continuity checks, and accommodation to other car maintenance procedures is vital to system. Demonstrable ruggedness and predictable life are particularly important to acceptance of a sensor system.

SUMMARY OF THE INVENTION

Accordingly, an object of the present invention is to provide a new and improved thermal sensor to monitor journal bearing temperature.

Another object of the invention is to provide a new and improved journal bearing temperature monitoring sensor that is efficient, reliable and automatic in operation.

Another object of the invention is to provide a new and improved journal bearing temperature monitoring sensor that is easily and economically incorporated into existing train equipment.

Another object of the present invention is the provision of a new and improved journal bearing thermal monitoring sensor that is rugged and quickly and inexpensively refurbished.

Yet another object of the present invention is the provision of a new and improved journal bearing temperature monitoring sensor that produces an output signal upon sensing a predetermined temperature.

A further object of the invention is the provision of a new and improved journal bearing temperature monitoring and actuation system capable of actuating the train brake system to stop the train upon detecting a predetermined temperature.

Still a further object of the invention is the provision of a new and improved journal bearing temperature monitoring and actuation system capable of automatically, reliably and efficiently actuating the train brake system to stop the train upon detecting a predetermined temperature, the monitoring and actuation system being rugged, economical and quickly refurbished.

Briefly, these and other objects of the present invention are attained in a thermal monitoring sensor housed in the roller bearing adapter comprising a quick-response, percussion-initiated electric generator activated by a heat-deformable temperature sensor. The electric signal is utilized to activate an electro explosive brake line venting mechanism attached to the brake line. An explosively-driven bellows motor actuator is triggered by the signal, causing a diaphragm cutter to rupture and vent the brake line, stopping the train prior to bearing overheating.

BRIEF DESCRIPTION OF THE DRAWINGS

Still other objects and many of the attendant advantages and features of this invention will be readily appreciated as the same becomes better understood by reference to the following detailed description when considered in connection with the accompanying drawings wherein:

FIG. 4 is a partially-sectioned, plan view of a train car embodying the anti-derailment system of the present invention;

FIG. 5 is an elevation view of the train car of FIG. 4;

DESCRIPTION OF THE PREFERRED EMBODIMENT

Figure 1:
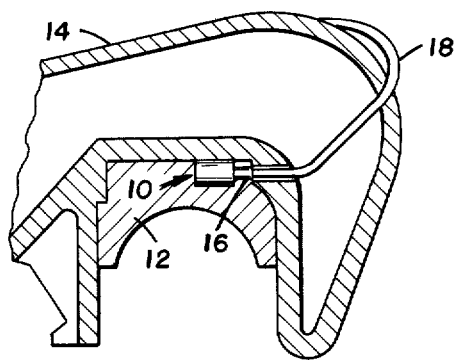
FIG. 1 is a partial, sectioned view of the sideframe showing the thermal sensor installation of the present invention.

Referring now to the drawings wherein like reference characters designate identical or corresponding parts throughout the several views, and more particularly to FIG. 1 thereof wherein the thermal monitor subsystem of the anti-derailment system is shown to include the thermal sensor 10 schematically shown positioned within a recess provided in a standard roller bearing adapter 12 positioned in the sideframe 14. Connected to the sensor 10 is an electric current generator 16 which is activated by the sensor, the current being carried to the brake actuator subsystem by means of a shielded conductor 18, such as sheathed or armored cable.

Figure 2A:
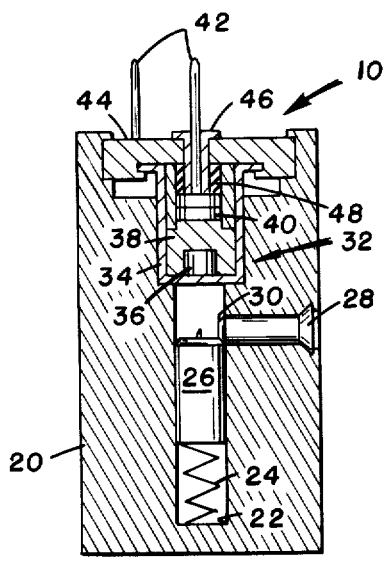
FIGS. 2a, 2b and 2c are sectioned views of alternative embodiments of the thermal sensor.
Figure 2B:
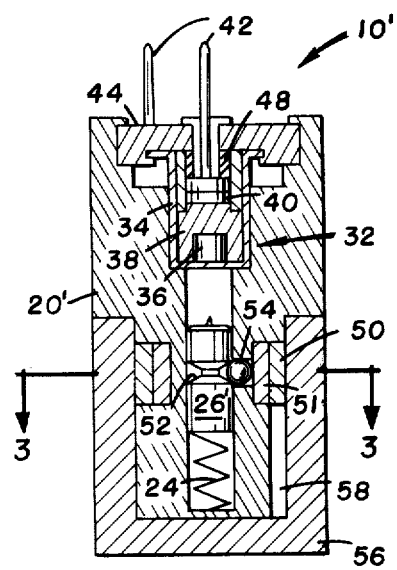
Figure 2C:
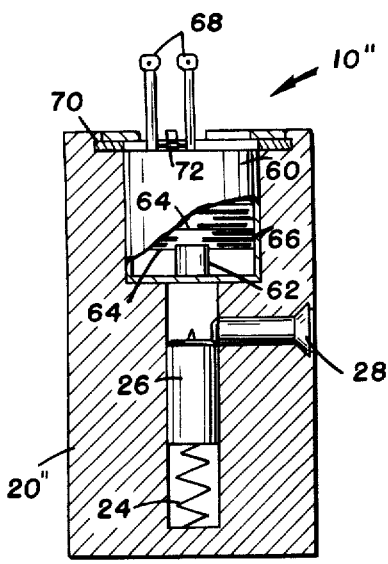

FIGS. 2a, 2b and 2c illustrate alternative embodiments of the thermal sensor 10-current generator 16 combination. Sensor body 20, of suitable thermal-conductive material such as aluminum or steel, is provided with an axial bore 22 extending substantially the length of the body. The lower, closed end of bore 22 provides a containment means for a spring 24 which biases a hardened firing pin 26 upwardly against a thermal release pin 28 extending from a transverse bore approximately midlength of body 20. The interior extremity of release pin 28 has a chamfer 30 which contacts a chamfer on the end of the firing pin 26 to restrain the pin against spring 24.

The open end of bore 22 is provided with a number of concentric counterbores to receive elements which comprise the assembled thermal sensor 10. Positioned in a first counterbore of a diameter larger than bore 22 is a combined stab detonator and electric power source 32 similar to those used in ordnance fuzing systems. The detonator/power source 32 comprises a cup-shaped housing 34; a stab detonator 36 positioned within the housing; a wave shaper 38 surrounding the detonator to moderate the explosive force and to transmit the pressure wave to the piezoelectric element 40 abutting the wave shaper; and contact terminals 42 abutting the power source and extending from the body 20 for electrical connection. A disc 44, having an aperture to receive contact 42 is pressed into a larger counterbore and suitably fastened to secure the detonator/power source 32 in place. An insulator sleeve 46 encircles contact 42 within the disc aperture. Encircling the inner end of contact 42 and positioned between the piezoelectric element 40 and the disc 44 is a sleeve-like resistor element 48 to bleed off any static charges.

Thermal release pin 28 may be made from 55-Nitinol, the generic name for a series of nickel-titanium intermetallic compound alloy having a unique "memory" property developed in 1961 by the Naval Ordnance Laboratory. Nitinol alloys, an acronym of Nickel Titanium Naval Ordnance Laboratory, have chemical compositions in the range from about 53 to 57 weight percent nickel and the balance titanium. The "memory" properties are such that, given the proper conditions, Nitinol objects can be restored to their original shape even after being "permanently" deformed out of that shape. The return to the original shape is triggered by heating the alloy to a moderate temperature. Considerable force is exerted and mechanical work can be done by the material as it "snaps back" to its original shape.

Nitinol will undergo a martensitic (diffusionless) transition with the ability of the alloy to undergo such a crystalline transition being temperature dependent. The maximum temperature at which this transition can occur is called the critical temperature and this temperature is a function of the alloy composition. The martensitic transition may be produced by deforming Nitinol below its critical temperature and this transition, due to the structural change taking place in the molecules, is accompanied by the liberation of heat energy. Then, if Nitinol is heated in its deformed condition to above its critical temperature, it will move in a direction opposite to the direction in which it has been deformed, and during this movement the Nitinol is capable of producing useful work.

The compositions and properties of Nitinol are described more fully in U.S. Pat. No. 3,174,851, issued Mar. 23, 1965. Briefly, the steps in imparting a shape "memory" to a Nitinol article include: forming the alloy into the shape that it will be called upon to "remember", i.e., its "memory configuration"; heat treating the Nitinol shape while it is constrained in a fixture and subsequently cooling it below the transformation temperature range; and then straining the part to an "intermediate shape", which is the shape that the part is to retain until it is heated to restore it to the memory configuration. The temperature to which the part must be heated in order to return it to the memory configuration depends upon the chemical composition of the alloy. This is described more fully in U.S. Pat. No. 3,558,369, issued Jan. 26, 1971.

As the 55-Nitinol part, in its intermediate shape, is heated to return to its memory configuration, the alloy exerts a very considerable force and can do significant mechanical work. Reference may be had to U.S. Pat. No. 3,403,238, issued Sept. 24, 1968, which discusses this phenomenon more fully.

The thermal release pin 28, strained in tension below its thermal transition temperature, restrains the spring-loaded firing pin 26. At the temperature range determined by its composition and processing, release pin 28 shrinks to its shorter, memory configuration and releases firing pin 26.

Figure 3:
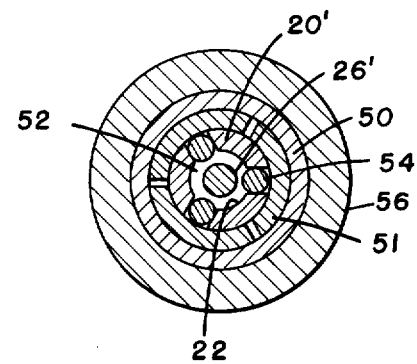
FIG. 3 is a view along line 3—3 of FIG. 2b.

Instead of the thermal release pin 28 of FIG. 2a, the thermal sensor shown in FIG. 2b utilizes a low-melting-point alloy to release the firing pin. Sensor body 20' is similar to body 20 of FIG. 2a, except that the lower portion is of reduced diameter which is provided with an annular groove to receive a low-melting-temperature, eutectic alloy ring 50 having a specific melting temperature, such as alloys of bismuth-lead-tin, bismuth-cadmium-tin, or combinations thereof. Eutectic alloys, or those alloys melting completely at a specific temperature, are most suitable. As shown in FIG. 2b and in the cross-sectional view of FIG. 3, firing pin 26' has a circumferential, V-shaped groove 52 which receives a plurality of steel retaining balls 54 positioned in holes between bore 22 and the alloy ring-receiving annular groove. Firing pin 26' is restrained against the spring 24 by the balls 54 which in turn are restrained by a segmented ball retainer 51. The alloy ring 50 surrounds the ball retainer 51. A closure sleeve 56 encloses the reduced-diameter portion of sensor body 20', covering the ball retainer and the alloy ring. A gap or void 58 is provided between one side of the body 20' and sleeve 56. When the sensor 10' experiences a temperature exceeding the melting temperature of alloy ring 50, the ring melts and flows into the gap 58, freeing the retaining balls 54 to release the firing pin 26'.

The operation of the thermal sensor is apparent from the foregoing description. Sensor 10 or 10' is heated by the overheated journal bearings, and with the sensor 10 of FIG. 2a, the increased temperature causes the thermal release pin 28 to shrink, as set forth above, and in the sensor 10' of FIG. 2b, the alloy ring 50 melts. Spring-loaded firing pin 26 and 26' are then released to impact upon detonator/piezoelectric power source 32, activating the detonator 36. The resulting explosive force, controlled by wave shaper 38, impinges upon the piezoelectric power source 40 to produce an electrical output which is utilized by the brake actuation subsystem of the present invention.

The electric power source may be of the piezoelectric element shown in FIGS. 2a and 2b or the thermal battery shown in FIG. 2c. Both of these means are known to those skilled in the art. Piezoelectric materials, such as lead zirconate/lead titanate sintered elements, electrically polarized to obtain the proper stress-output axis, are crushed by the explosive force of detonator 36 to produce a relatively high voltage of short duration. In a typical low-resistance output circuit the current is approximately 35 amperes. Since there is a "race" between generation of a large electrical output from the extremely high explosive-generated pressures on the crystal and its termination by destruction of the electrical continuity of the output, the aluminum "wave-shaper" 38 is used to strike a balance between these opposed events.

The sensor 10" of FIG. 2c is similar to that of FIG. 2a except that the piezoelectric element has been replaced with a thermal pulse battery 60. A stab-type percussion primer 62 is activated by the firing pin 26 to produce a flame which ignites layers of pyrotechnic material within the waffer-type cells of the heat pads 64. Burning of this material produces sufficient heat to melt the electrolyte, a salt such as lithium/potassium chloride, deposited within the electrochemical cells 66 between the heat pads 64. Once the electrolyte is melted and its ions released, normal electro-chemical action generates voltage until the active materials are depleted or cooling resolidifies the electrolyte. Terminals 68 serve their customary purpose as electrical output connectors. A snap ring 70 secures the thermal battery 60 within the receiving bore of the sensor body 20, and a resistor 72 joins the terminals 68 to facilitate electrical continuity check during testing of the system. In operation sensor 10" function similarly as sensor 10 of FIG. 2a except that shrinking of the thermal release pin 28 permits the firing pin 26 to ignite the pyrotechnic material in the thermal battery to produce the electric current. Of course, thermal battery 64 may also be used with the sensor 10' of FIG. 2b.

FIGS. 4 and 5 show the plan view and elevation view, respectively, of a train car 76 provided with the brake actuation subsystem of the present invention. Positioned in the sideframes of each train truck are the thermal sensor 10, 10' or 10" of FIGS. 2 which continuously monitors the temperature of the journal bearings and activates the brake actuation subsystem once the bearing temperature exceeds a predetermined limit. The thermal sensors 10, each with its associated electric power source 16, are electrically connected by the shielded conductor system 18 to the brake line venting mechanism 92. Shielding of the conductor prevents stray electromagnetic signal interference and protects against the adverse environment beneath the rail car truck. The train's brake line 78 extend the length of car 76 and terminate in end couplings 80. Connected to the train line 78 are other components of the pneumatic brake system common in train cars, including the brake valve 84, brake cylinder 86 and brake reservoirs 88.

Figure 6:
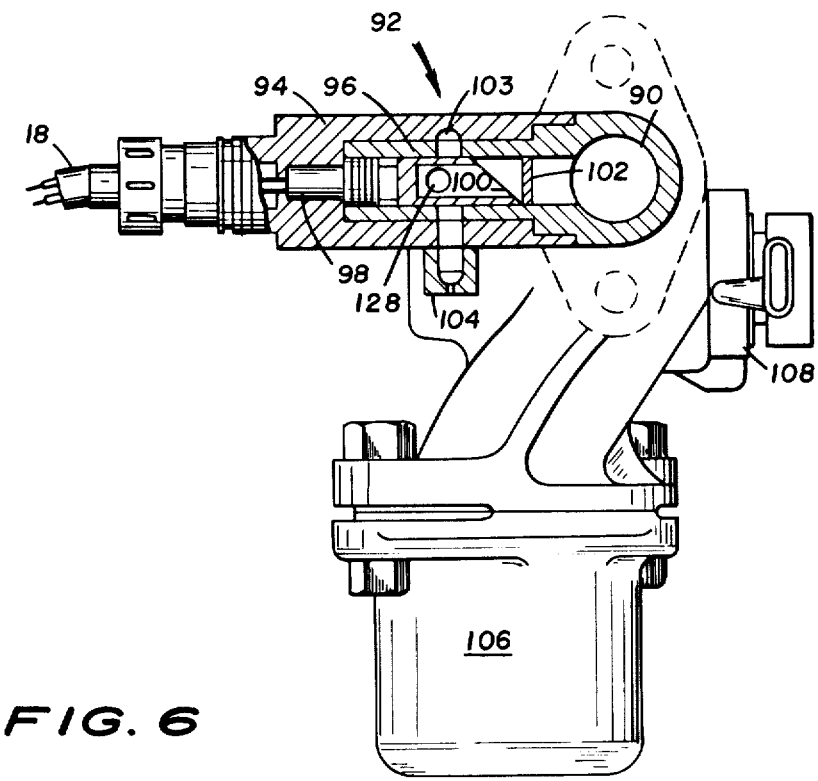
FIG. 6 is a partially-sectioned view of the brake line venting mechanism.

Positioned on the brake pipe 90 joining the brake valve 84 to the train line 78 is the brake line venting mechanism 92, shown more fully in FIG. 6. The venting mechanism includes an electromagnetic radiation shield 94 surrounding a diaphragm cutter having a cylindrical housing 96; an explosively-driven bellows motor actuator 98 connected to the electrical conductors 18 positioned at one end of housing 96; slidably-mounted cutter 100 disposed adjacent the actuator 98; a shearable diaphragm 102 positioned adjacent the other end of housing 96 to separate the housing from the internal passage of brake pipe 90; an annular passage 103 provided in the housing 96 to permit passage of air from the brake pipe 90 after diaphragm rupture; and a calibrated venting orifice structure 104 to vent the released air. Also visible in FIG. 6 is the dirt chamber 106 and the cut-out cock 108, elements common to train brake systems. The shield 94 around the diaphragm cutter serves the same purpose as the shielding around conductor 18. The diaphragm cutter may be similar to that disclosed in copending application Ser. No. 465,400, filed Apr. 29, 1974, and the explosive piston-type cutter actuator described therein may be used in place of the bellows motor actuator 98.

Figure 7:
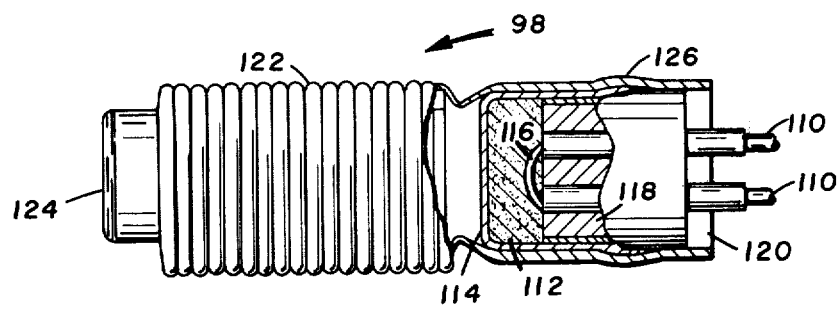
FIG. 7 shows the bellows motor actuator of FIG. 6.

Details of the bridge-wire bellows motor actuator 98 may be seen in FIG. 7 wherein the wires 110 of the shielded conductor 18 are positioned against a propellant 112 contained in cup 114, the ends of wires 110 being joined by a fine bridge wire 116 embedded in the propellant. Wires 110 are suitably insulated with insulating material 118, and cup 114 is sealed with a plug 120 of glass, plastic or other suitable material. Bellows 122 is pleated from suitable malleable, ductile metal, such as copper, with the forward end formed into a blunt nose 124 and the edge of the aft, open end crimped over the seal plug 120. Approximate this open edge, the bellows 122 is provided with an outwardly-extending ridge 126, which receives a similarly-shaped ridge formed on the propellant cup 114 to properly position the cup.

The operation of the bellows motor actuator 98 and the venting mechanism 92 can be readily seen from the foregoing description. Briefly, the propellant 112 is ignited by the signal generated by current generator 16, as set forth above, the expanding gases forcibly extending the bellows 122, causing the blunt nose 124 to contact and displace cutter 100, which in turn severs diaphragm 102 to release the air from brake pipe 90, thus slowing and eventually stopping the train. The escaping air flows out through passage 103 and the venting orifice 104. As the air flows through orifice 104, a distinct, audible sound is produced to help the train crew locate the car which has been braked and to correct the possible derailment-causing condition. This permits remedial action prior to any actual derailment. Additionally, the actuation of the brake system can be monitored from a central location, such as the engine cab.

Bellows 122 is sufficiently rigid after expansion to prevent cutter 100 from being forced by air pressure back through the ruptured diaphragm and possibly obstructing the flow. To further assure free air flow, cutter 100 may be hollow with an opening 128 therein to permit unobstructed flow between brake pipe 90 and annular passage 103.

Obviously, numerous modifications and variations of the present invention are possible in the light of the above teachings. It is therefore to be understood that within the scope of the appended claims the invention may be practiced otherwise then as specifically described herein.

What is claimed as new and desired to be secured by Letters Patent of the United States is:

1. In combination with a train car a thermal sensor and actuator system for monitoring bearing temperature and actuating the train brake system at a predetermined temperature comprising:
   a thermal sensor positioned approximate the train journal bearings to release an impact member at a predetermined temperature;
   signal producing means cooperating with said thermal sensor to produce an output signal; and
   electroexplosive means responsive to said output signal to vent the brake lines on said train car to stop said train car.

2. The combination of claim 1 wherein said electroexplosive means comprises a explosively-actuated diaphragm cutter.

3. The combination of claim 2 wherein said signal producing means comprises a power source responsive to said impact member to produce an electric signal.

4. The combination of claim 3 further comprising conductor means connecting said power source and said diaphragm cutter.

5. The combination of claim 1 wherein said thermal sensor comprises:
   a deformable, temperature-responsive means;
   a spring-loaded firing pin restrained in a cocked position by said temperature-responsive means; and
   a power source responsive to impact of said firing pin to produce an output current upon release of said firing pin by said temperature-responsive means.

6. The combination of claim 5 wherein said deformable, temperature-responsive means comprises a material which undergoes a phase change at a predetermined temperature.

7. The combination of claim 6 wherein said electroexplosive means comprises an explosively-actuated diaphragm cutter to puncture and vent the train brake line.

8. The combination of claim 7 wherein said diaphragm cutter is actuated by an explosively-extended bellows motor.

9. The combination of claim 8 further comprising a calibrated venting means connected to said diaphragm cutter capable of producing an audible signal upon brake line venting.

10. The combination of claim 9 wherein said deformable, temperature-responsive material comprises an alloy having a crystalline phase change at a predetermined temperature.

11. The combination of claim 10 wherein said crystalline phase change alloy comprises an intermetallic alloy of nickel and titanium having a shape change above a predetermined temperature.

12. The combination of claim 9 wherein said temperature-responsive material comprises a eutectic alloy having a predetermined melting temperature.

13. The combination of claim 12 wherein said alloy comprises an alloy of bismuth.

14. The combination of claim 12 wherein said power source comprises a piezoelectric element initiated by impact of said firing pin.

15. The combination of claim 14 wherein said piezoelectric element comprises a detonator initiated by said firing pin and piezoelectric crystals crushed by pressure from said detonator to produce an electric current.

16. The combination of claim 12 wherein said power source comprises a thermal battery activated by impact of said firing pin.

17. The combination of claim 16 wherein said thermal battery comprises:
   a pyrotechnic reactant;
   an electrochemical reactant; and
   a percussion primer triggered by impact of said firing pin to initiate an electric-current-producing reaction between said pyrotechnic reactant and said electrochemical reactants.

18. The combination of claim 11 wherein said power source comprises a piezoelectric element initiated by impact of said firing pin.

19. The combination of claim 18 wherein said piezoelectric element comprises a detonator initiated by said firing pin and piezoelectric crystals crushed by pressure from said detonator to produce an electric current.

20. The combination of claim 11 wherein said power source comprises a thermal battery activated by impact of said firing pin.

21. The combination of claim 20 wherein said thermal battery comprises:
   a pyrotechnic reactant;
   an electrochemical reactant; and
   a percussion primer triggered by impact of said firing pin to initiate an electric-current-producing reaction between said pyrotechnic reactant and said electrochemical reactants.

* * * * *